United States Patent
Lin et al.

(10) Patent No.: US 6,736,295 B2
(45) Date of Patent: May 18, 2004

(54) HIGH FLOW CARAFE

(76) Inventors: Shin-Shuoh Lin, 27022 Falling Leaf Dr., Laguna Hills, CA (US) 92653; Ji-Jun Wu, 27022 Falling Leaf Dr., Laguna Hills, CA (US) 92653

(*) Notice: Subject to any disclaimer, the term of this patent is extended or adjusted under 35 U.S.C. 154(b) by 226 days.

(21) Appl. No.: 10/143,911

(22) Filed: May 13, 2002

(65) Prior Publication Data

US 2003/0209563 A1 Nov. 13, 2003

(51) Int. Cl.[7] .............................................. A47G 19/14
(52) U.S. Cl. ................... 222/475.1; 222/552; 222/553; 215/356; 215/13.1
(58) Field of Search .............................. 222/475, 475.1, 222/549, 552, 553, 554; 215/356, 13.1, 12.1

(56) References Cited

U.S. PATENT DOCUMENTS

| | | | | |
|---|---|---|---|---|
| 2,735,566 A | * | 2/1956 | Bramming | 222/552 |
| 3,776,433 A | * | 12/1973 | De Treitas | 222/519 |
| 3,785,539 A | * | 1/1974 | Wetterek | 222/552 |
| 4,121,730 A | * | 10/1978 | Dammer | 215/356 |
| 4,630,742 A | * | 12/1986 | Miyaji et al. | 215/356 |
| 4,658,973 A | * | 4/1987 | Zimmermann | 222/552 |
| 4,726,478 A | * | 2/1988 | Zimmermann | 222/572 |
| 4,754,888 A | | 7/1988 | Letch et al. | |
| 4,768,664 A | * | 9/1988 | Zimmermann | 215/12.1 |
| 4,930,687 A | * | 6/1990 | Brindopke et al. | 222/475.1 |
| 5,060,827 A | * | 10/1991 | Segati | 222/552 |
| 5,249,703 A | | 10/1993 | Karp | |
| D346,933 S | | 5/1994 | Denny et al. | |
| D362,156 S | | 9/1995 | Goto et al. | |
| D362,369 S | | 9/1995 | Bridges | |
| D373,051 S | | 8/1996 | Kramer et al. | |
| D386,948 S | | 12/1997 | Wissinger | |
| D396,777 S | | 8/1998 | Inoue | |
| D398,187 S | | 9/1998 | Parker | |
| D411,713 S | | 6/1999 | Bridges | |
| 5,918,761 A | | 7/1999 | Wissinger | |
| D416,757 S | | 11/1999 | Ginuntoli | |
| D425,758 S | | 5/2000 | Freed | |
| 6,561,390 B2 | * | 5/2003 | Boyte et al. | 222/475.1 |
| 6,662,978 B2 | * | 12/2003 | Lin et al. | 222/509 |

* cited by examiner

Primary Examiner—Kenneth Bomberg
(74) Attorney, Agent, or Firm—Gordon K. Anderson

(57) ABSTRACT

A vacuum insulated carafe having high flow characteristics is taught, which includes a double wall metallic body (22) with the air evacuated from the space between the walls forming an insulating layer. The body has a top (26) and a bottom (28) with a base (30) attached to the bottom for resting the carafe on a flat surface. A mounting ring (34) is connected to the top of the body and includes a outside surface (36) and a central opening (38), with the outside surface having a pouring spout (40) and a handle (50). An interfacing gasket (54) seals the mounting ring to the body and a stopper (58), having a cap (70), an inner cup (60) and an outer ring (62) containing external male threads, and a plurality of integral ribs (68) connect the cup to the ring while forming a void (68) between the ribs. A liquid sealing gasket (72) is disposed between the stopper and the mounting ring. In operation, the stopper is screwed in until it contiguously engages the ring for sealing and when the stopper is unscrewed, a horizontal gap is formed between the sealing gasket and the ring, providing a passageway through the gap and the void that is formed between the ribs, permitting a high flow of liquid to pour from the carafe.

16 Claims, 6 Drawing Sheets

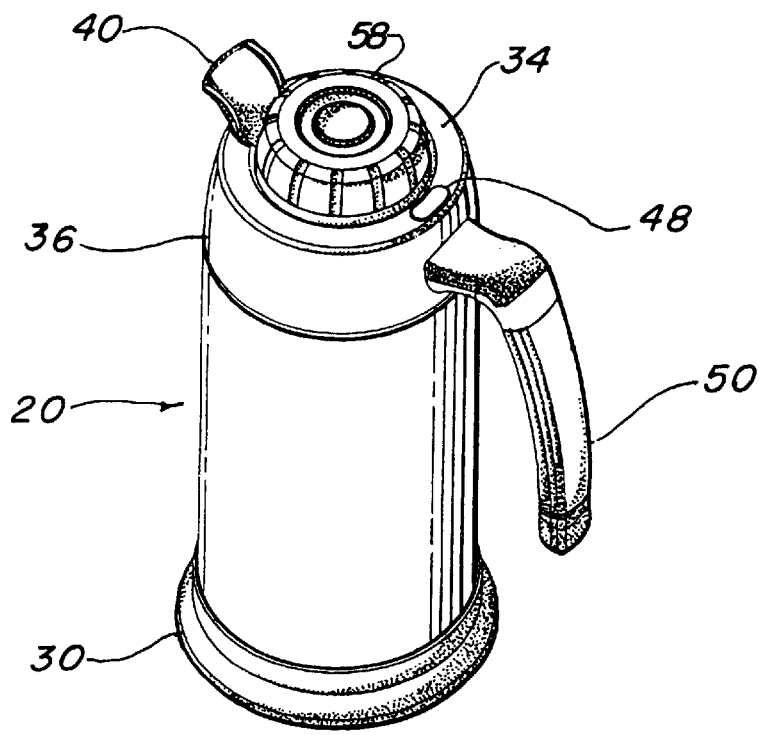
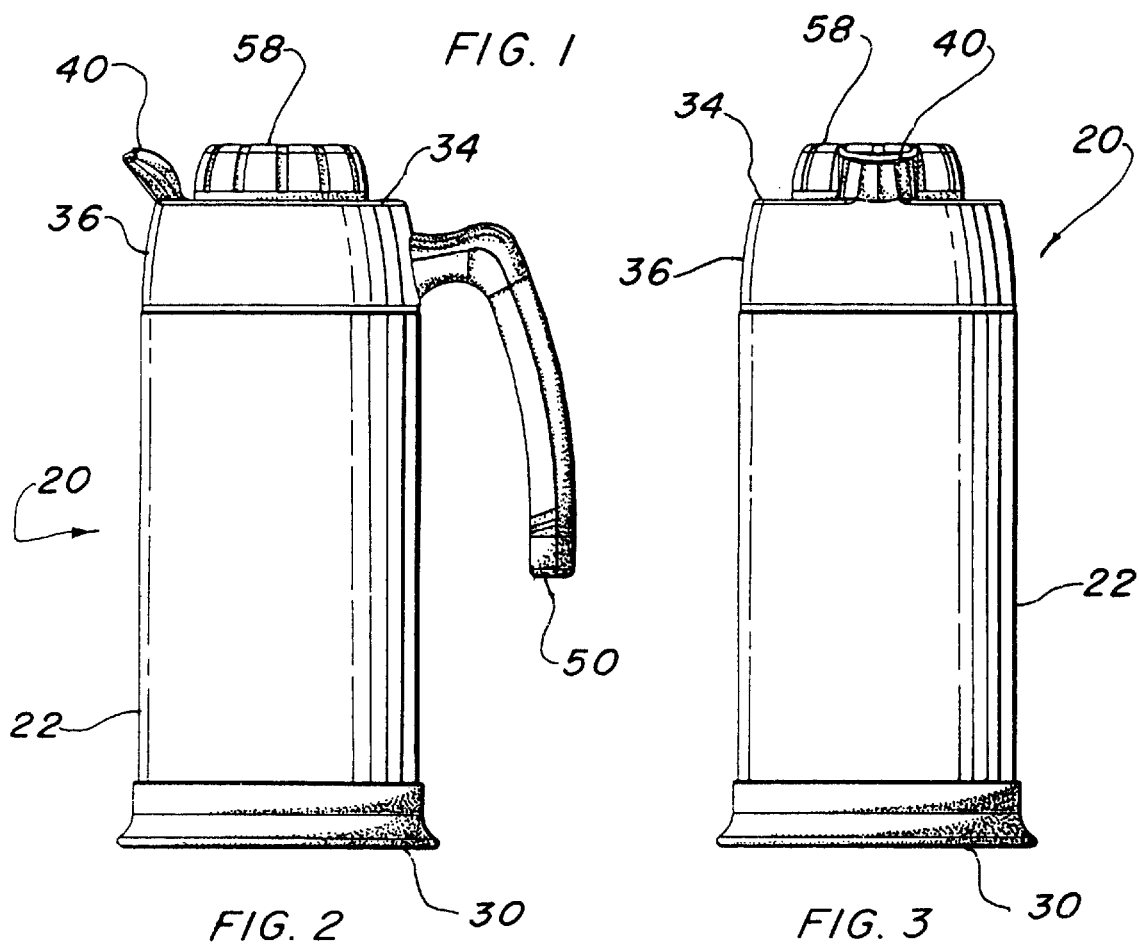
FIG. 1
FIG. 2
FIG. 3

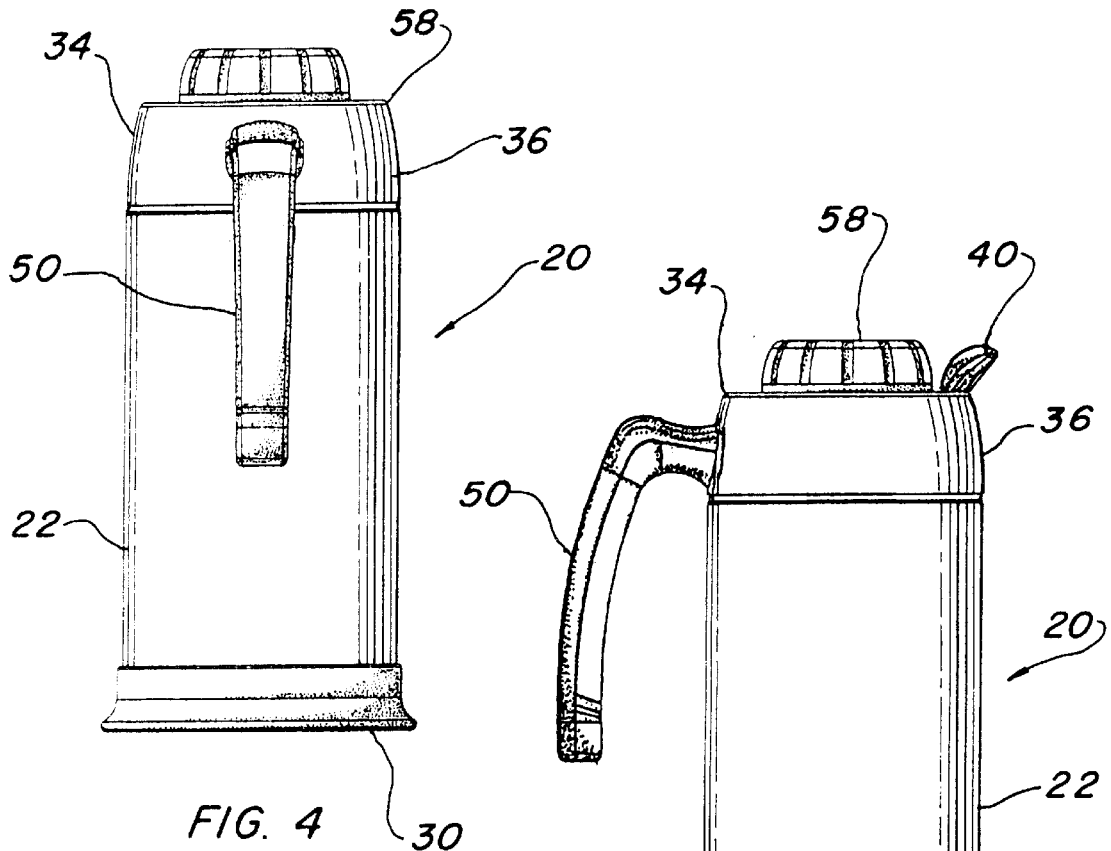
FIG. 4
FIG. 5
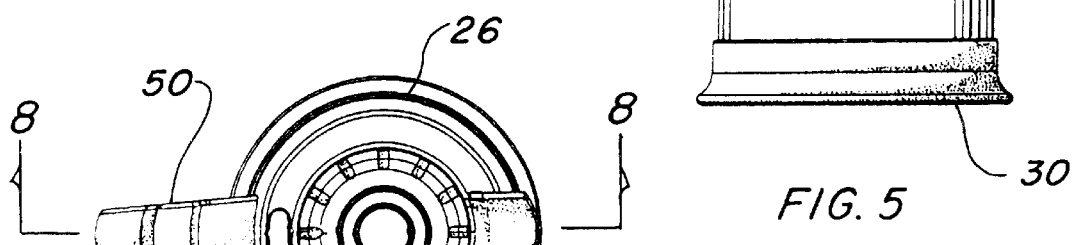
FIG. 6
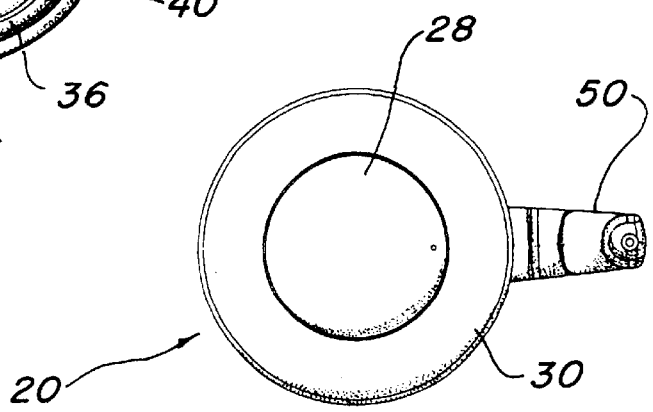
FIG. 7

HIGH FLOW CARAFE

TECHNICAL FIELD

The present invention relates to carafes in general. More specifically to a vacuum insulated carafe that includes a lid requiring only a minimum of rotation to permit relatively unrestricted flow through the stopper and pouring spout which is particularly useful with liquids that have a higher viscosity than water, such as used for creamers etc.

BACKGROUND ART

Previously, many types of vessels such as coffee or beverage cups and mugs along with servers and carafes, having lids or stoppers, have been used in endeavoring to provide an effective means to contain a liquid while preventing spillage and retaining the temperature of the liquid within.

A few of the prior art patents listed below did not disclose any of the novelty of the instant invention, however the following U.S. patents are considered related:

| U.S. Pat. No. | Inventor | Issue Date |
| --- | --- | --- |
| Des. 346,933 | Denny et al. | May 17, 1994 |
| Des. 362,156 | Goto et al. | Sep. 12, 1995 |
| Des. 362,369 | Bridges | Sep. 19, 1995 |
| Des. 373,051 | Kramer et al. | Aug. 27, 1996 |
| Des. 386,948 | Wissinger | Dec. 02, 1997 |
| Des. 396,777 | Inoue | Aug. 11, 1998 |
| Des. 398,187 | Parker | Sep. 15, 1998 |
| Des. 411,713 | Bridges | Jun. 29, 1999 |
| Des. 416,757 | Ginuntoli | Nov. 23, 1999 |
| Des. 425,758 | Freed | May 30, 2000 |
| 4,754,888 | Letsch et al. | Jul. 05, 1988 |
| 5,249,703 | Karp | Sep. 05, 1993 |
| 5,918,761 | Wissinger | Jul. 06, 1999 |

Letsch et al. in U.S. Pat. No. 4,754,888 discloses a carafe with an inner container surrounded by a casing. The inner container and the casing have an opening at the top which may be closed by a separate plug. The plug and opening in the container and casing are shaped such that it is possible to fill or empty the inner container while the plug is still in the opening. The plug and container both have mating grooves that provide opposed flow paths into and out of the container. The container also includes a basin around the top for receiving coffee from a coffee maker and the plug has openings to provide a flow path from the basin into the container interior.

Karp in U.S. Pat. No. 5,249,703 teaches a travel mug that includes a container and a lid in combination. The container has a handle and an annular lip that has an annulus capable of forming a seal with the top side of the annular lip. A cylindrical well in the lid has a vertical dividing wall such that the lid may be readily rotated by hand. The retaining arms extend from the underside of the lid and engage the underside of the annular lip to pull it into tight abutment. Diametrically opposed gaps in the lip act as passageway for the retaining arms. Similarly diametrically opposed notches in the lid align with the gaps to allow liquid to be poured from the container.

U.S. Pat. No. 5,918,761 issued to Wissinger is for an insulated container and cover combination that has an outer container shell terminating at an opening with a surrounding edge. An inner container shell is nested within the outer container shell and has an opening surrounded by a continuous edges in abutment with the surrounding edge. The inner container shell is spaced inwardly and is out of contact with the outer shell. A cover mounting assembly is attached to the outer shell adjacent to the opening. A single seal, made of elastomeric material, has a sealing surface disposed at the interface of the shells. Locating rings define the removable cover mounting assembly and locate the single sealing ring on the inner and outer shells.

For background purposes and as indicative of the art to which the invention is related reference may be made to the remaining cited design patents.

DISCLOSURE OF THE INVENTION

It is common for a coffee carafe to have a screwed in cap or stopper and to have a set of gaps that align when the stopper is rotated a quarter of a turn permitting liquid to flow from the container. The problem with prior art is that the combination of the openings and the gap between the stopper and the carafe are not large enough as the gap is governed by the pitch of the threads which is insufficient to provide a high flow when only turned a quarter of a turn.

This issue is particularly important when the carafe is used a creamer, as the viscosity of cream, half and half, non-dairy cream and even milk is greater than coffee or water therefore the problem is greatly increased to the extent that some of the prior art carafes are not usable for this application.

Another difficulty is that the quarter turn is not always understood by the user as the carafe may be labeled properly however in commercial establishments the equipment must be easily rationalized without written instruction, only human intuition. It is therefore a primary object of the invention to have an operating system so simple as to be understood by all. When a person rotates the stopper to loosen it adequate liquid should come out and if the flow is insufficient it is reasonable to turn the stopper a little further until the flow rate is satisfied. This type of control is universally understood and obvious to the casual observer.

An important object of the invention is the structure that permits high flow with only a small amount of rotation of the stopper. This unique feature is accomplished by having the stopper formed of two separate pieces, an inner cup and a outer ring formed with a number of ribs separating the two elements leaving a relatively large gap in between. Common so called Acme threads permit the stopper to be rotated and separate from the carafe in an understandable manner and high flow of the liquid is afforded since there is ample space allowed in the gap between the ribs.

Another object of the invention is directed to the ease of identification of the carafe for use with different creamers. The plug that covers opening in the mounting ring to insert the attaching screw is an ideal element to indicate by both color and indicia the contents. The plug may be easily changed and a number of separate plugs may be furnished with the carafe, marked with the contents, as they are inexpensive and easy to manufacturer and install.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment of the high flow carafe.

FIG. 2 is a right side elevation view of the preferred embodiment.

FIG. 3 is a front elevation view of the preferred embodiment.

FIG. 4 is a rear elevation view of the preferred embodiment.

FIG. 5 is a left side elevation view of the preferred embodiment.

FIG. 6 is a top plan view of the preferred embodiment.

FIG. 7 is a bottom view of the preferred embodiment.

BEST MODE FOR CARRYING OUT THE INVENTION

Figure 8:
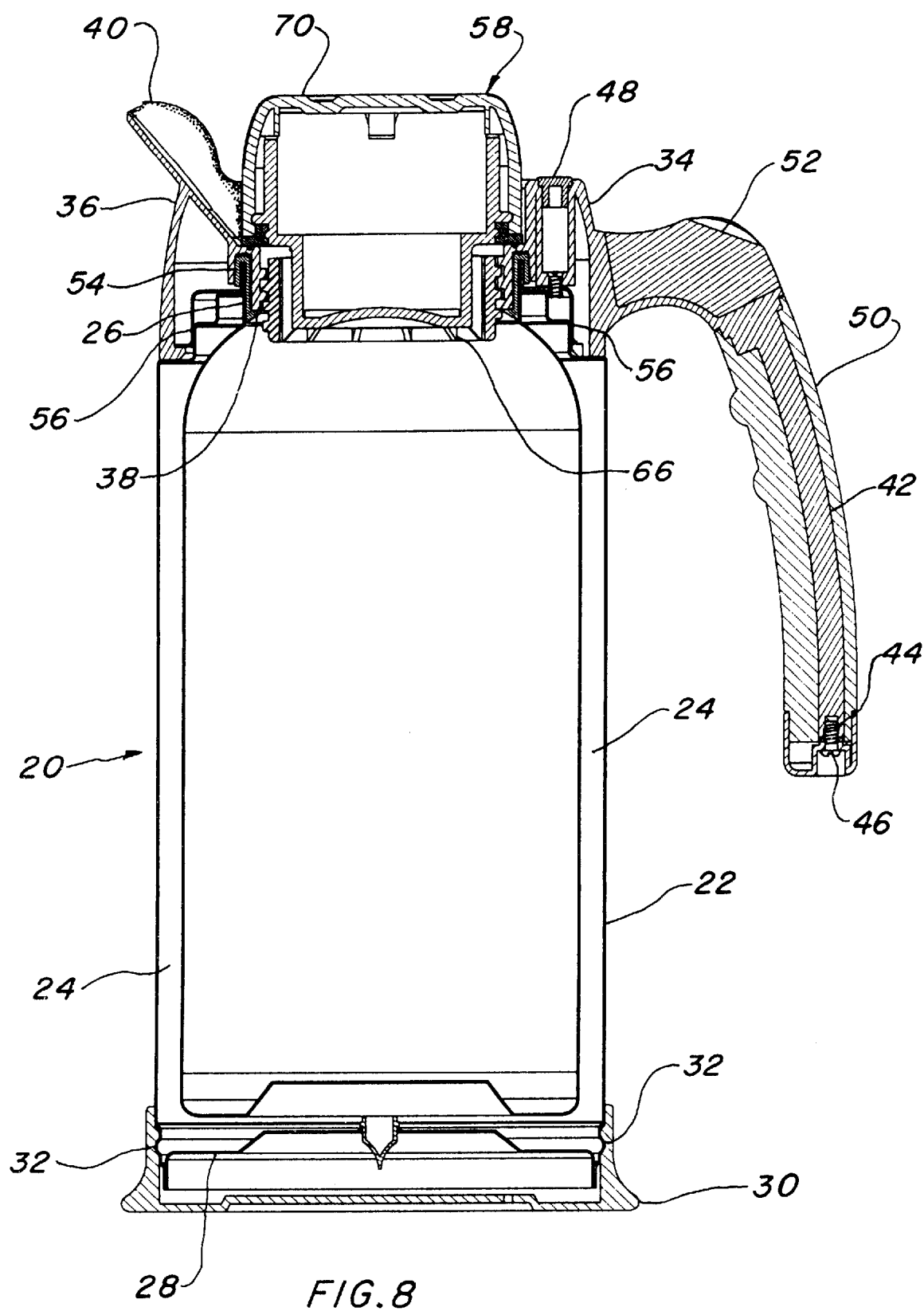
FIG. 8 is a cross sectional view taken along lines 8—8 of FIG. 6.

The best mode for carrying out the invention is presented in terms of a preferred embodiment. This preferred embodiment is in the form of a vacuum insulated carafe 20 used primarily to store and serve coffee, hot chocolate or other beverages however this unique invention is particularly well suited for use as a creamer since it has high flow capabilities. The invention is shown in FIGS. 1 thorough 15 and is comprised of a double wall metallic body 22 having an air evacuated middle space 24 forming an insulating layer between the walls. The body has a top 26 and a bottom 28, as illustrated in FIGS. 1–8, and the body 22 is preferably fabricated of stainless steel, basically formed using techniques well known in the art. While the preferred embodiment utilizes a vacuum insulated double wall construction other types of insulation's are applicable to this invention and different material such as thermoplastics are equally well considered in the fabrication of this vessel.

A base 30 is attached to the bottom of the body 22 as shown in FIGS. 1–5, 7 and 8 and is used for resting the carafe 20 on a flat surface. The base 30 is formed of a thermoplastic selected from a group consisting of cellulose, phenolic, phenylene oxide, polycarbonate, polyester, polyethylene, polypropylene, polystyrene, acetyl, polyester, phenylene oxide, polymide or poly vinyl cloloride, however, other materials will work equally well in the application. The base is snapped into place on a bead 32 integrally formed in the body 22 of the carafe as shown in FIG. 8.

A mounting ring 34 is connected to the top 26 of the body 22 and includes an outside surface 36 and a central opening 38. The mounting ring outside surface 36 has a pouring spout 40 and, opposed on the outside surface, handle attachment means 42, with internal threads 44 formed within the central opening 38. The mounting ring 34 is formed of a similar thermoplastic to the base 30 i.e. cellulose, phenolic, phenylene oxide, polycarbonate, polyester, polyethylene, polypropylene, polystyrene, acetyl, polyester, phenylene oxide, polymide, poly vinyl cloloride or the like.

The mounting ring 34 is attached to the metallic body 22 with a threaded fastener 46 that is covered and protected by a snap-in cover 48. This snap-in cover 48 preferably contains indicia thereon indicating the type of liquid stored within the carafe 20 which is particularly important when the carafe is used as a creamer. It should also be noted that the mounting ring internal threads 44 are, the so called acme type threads, for allowing maximum displacement relative to the amount of rotation required.

A handle 50 of a resilient material preferably with a separate bottom cover is placed over the handle attaching means 42 and attached with another threaded fastener 46 similar to the attaching method of the ring 34 to the body 22. The handle 50 also includes a top thumb portion 52 again of the same resilient material.

Figure 9:
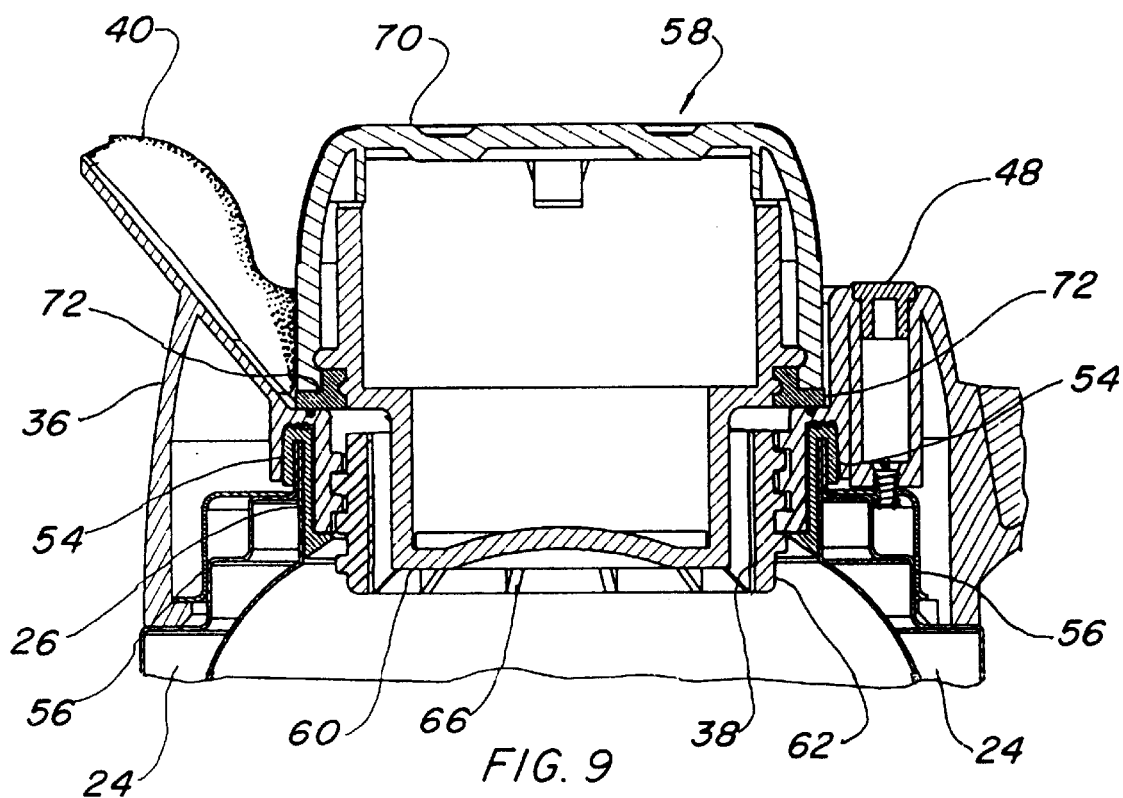
FIG. 9 is a cross sectional view taken along a centerline through the handle of the preferred embodiment illustrating the stopper in the closed position.

An interfacing gasket 54 is provided for sealing the mounting ring 34 to the body 22 with the material of its construction be selected from the group consisting of silicone, natural rubber, synthetic rubber, thermoplastic, neoprene, and viton however other materials may also be used. The gasket 54 is illustrated best in FIGS. 8–10 and is slid over a nested upstanding neck integral with the body 22 and a formed metallic locking ring 56. The purpose of the gasket 54 is to close the interface of the body 22 to the mounting ring 34 and the locking ring 56 creating a hermetic seal.

Figure 15:
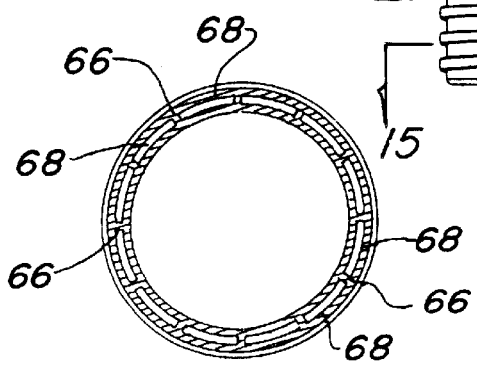
FIG. 15 is a cross sectional view taken along lines 15—15 of FIG. 14.
Figure 16:
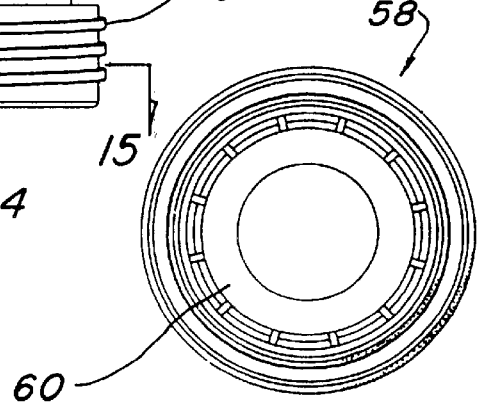
FIG. 16 is a bottom view of the stopper completely removed from the invention for clarity.
Figure 17:
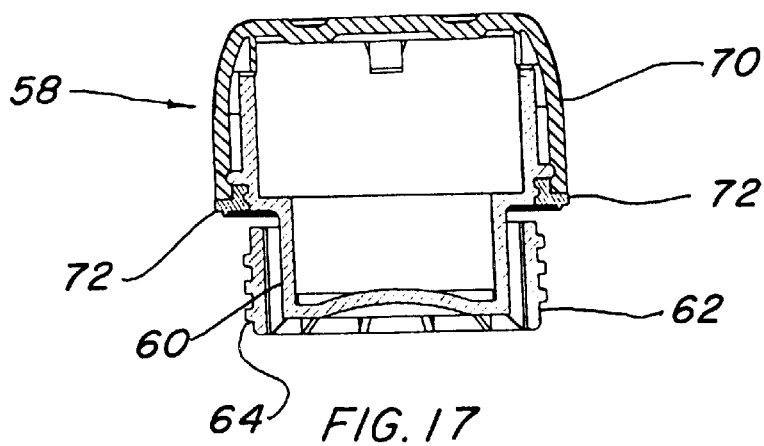
FIG. 17 is a cross sectional view taken along lines 17—17 of FIG. 11.
Figure 18:
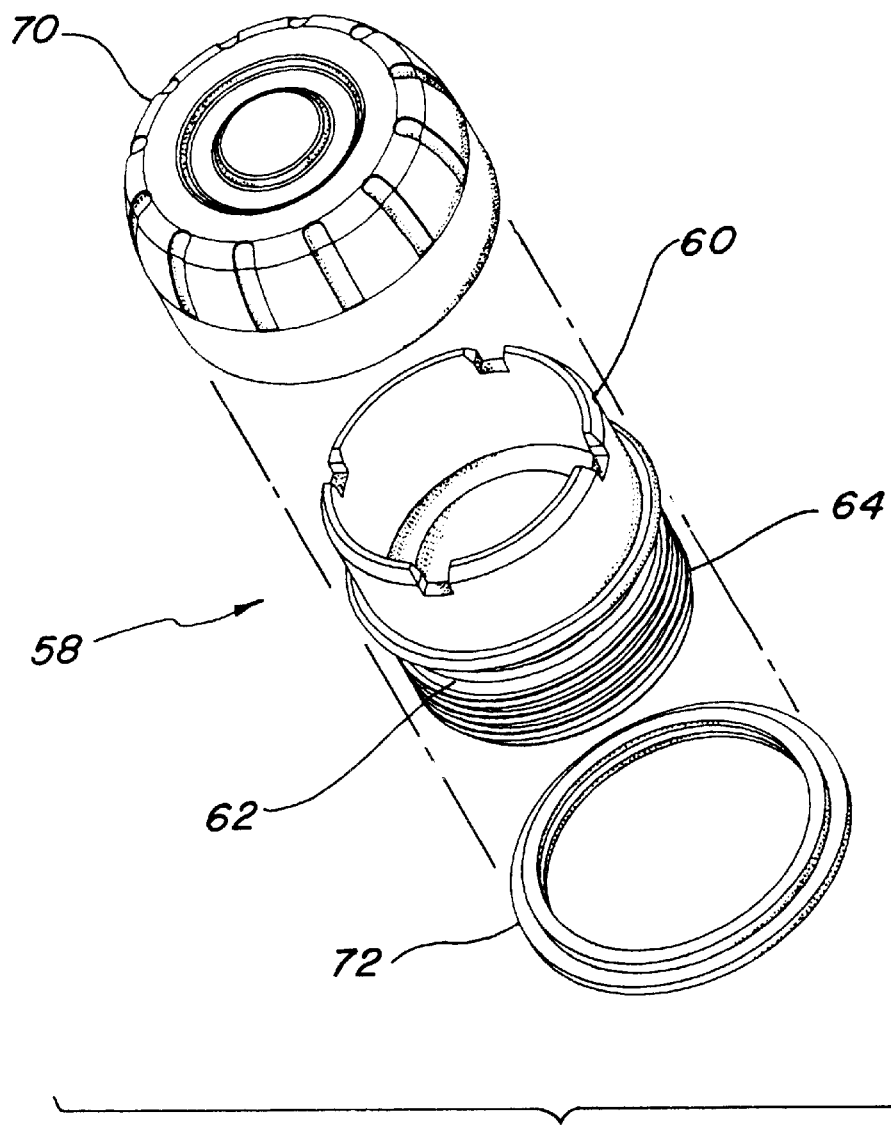
FIG. 18 is an exploded view of the stopper completely removed from the invention for clarity.

A stopper 58 is defined as having an inner cup 60 and an outer ring 62 as illustrated in FIGS. 8–10 and 17. The outer ring 62 contains external male threads 64 and a plurality of integral ribs 66 connecting the cup 60 to the ring 62. This relationship forms a void 68 between the ribs 66, the inner cup 60 and the outer ring 62 as depicted in FIG. 15. The ribs 66 extend exclusively between the cup 60 and the ring 62 and are angularly formed on a lower end to offset parallel misalignment of the cup to the ring as illustrated best in FIGS. 8–10. It is important to note that the ribs 66 have a width of not more than 0.036 times the mean diameter, as shown in FIG. 15, in order to obtain the high flow of liquid as essential to the invention.

A cap 70 is snapped onto the stopper inner cup 60 forming a dead air space between the cap 70 and the inner cup 60 creating an insulating barrier. The stopper 58, including the cap 70, are formed of a thermoplastic selected from the group consisting of cellulose, phenolic, phenylene oxide, polycarbonate, polyester, polyethylene, polypropylene, polystyrene, acetyl, polyester, phenylene oxide, polymide and poly vinyl cloloride with other materials also being acceptable.

Figure 10:
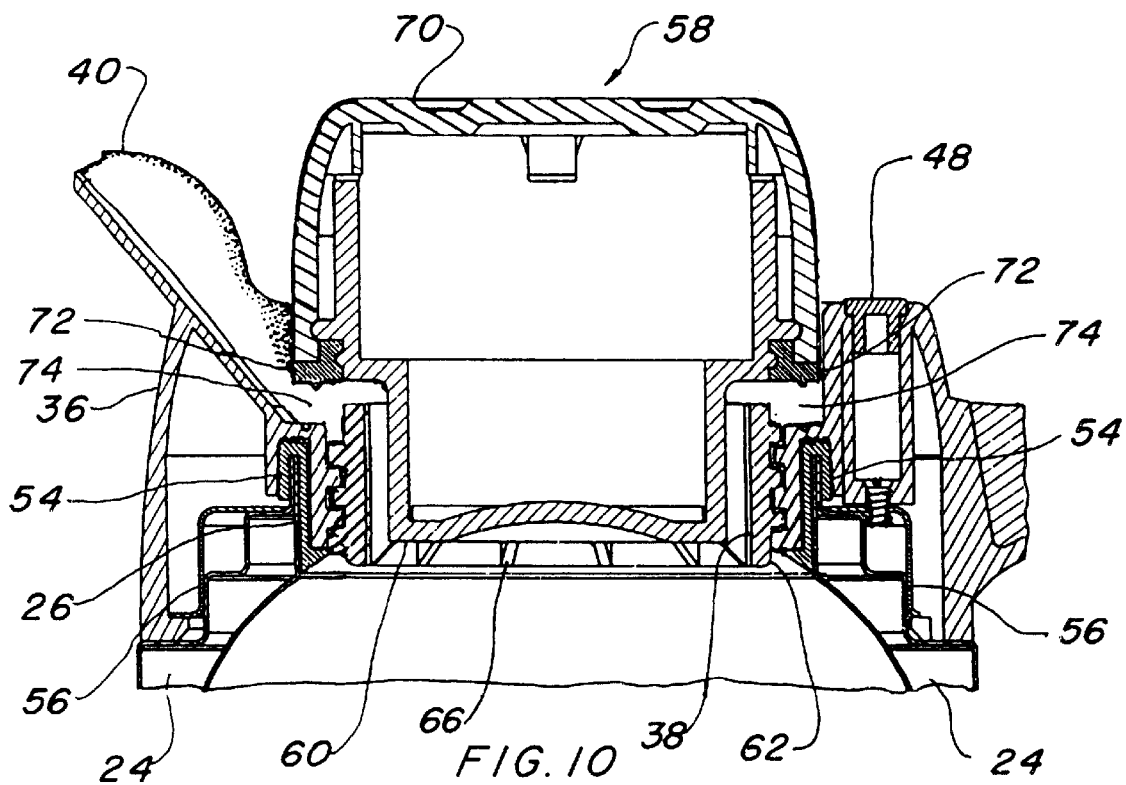
FIG. 10 is a cross sectional view taken along a centerline through the handle of the preferred embodiment illustrating the stopper in the open position with the stopper twisted slightly counterclockwise, thus accomplishing a high flow.
Figure 11:
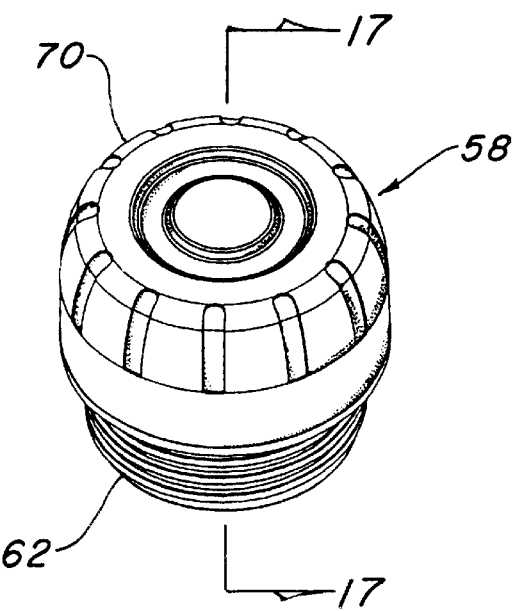
FIG. 11 a partial isometric view of the stopper completely removed from the invention for clarity.
Figure 12:
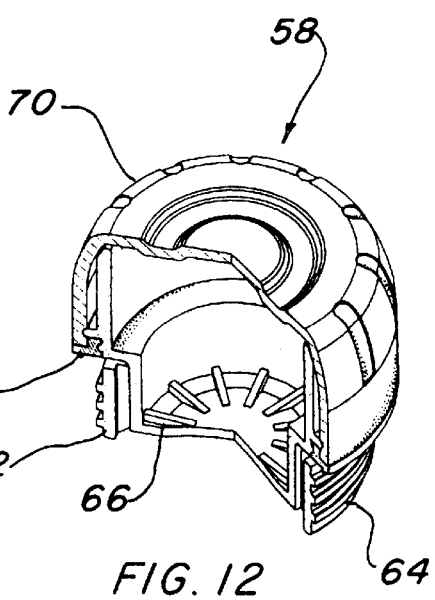
FIG. 12 is a cutaway partial isometric view of the stopper completely removed from the invention for clarity.
Figure 13:
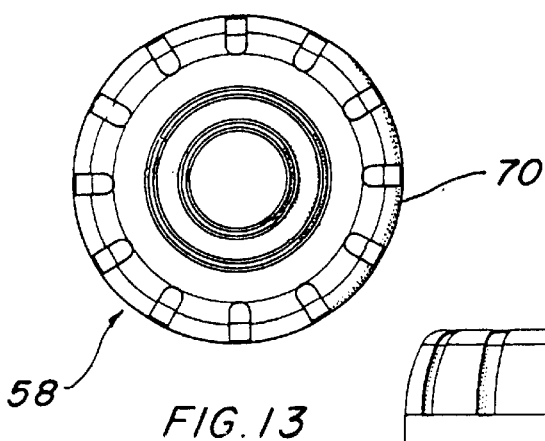
FIG. 13 is a top plan view of the stopper completely removed from the invention for clarity.
Figure 14:
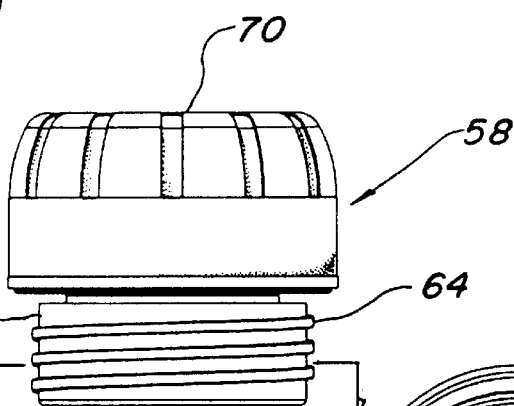
FIG. 14 is a side elevation view of the stopper completely removed from the invention for clarity.

A liquid sealing gasket 72 is disposed between the cap 70 and the inner cup 60 assuring a airtight seal therebetween. In addition the gasket 72 creates a sealing surface between the stopper 58 and the mounting ring 34 which allows sealing the stopper 58 to the mounting ring 34 when the stopper 58 is screwed in until the it contiguously engages the ring 34. When the stopper 58 is unscrewed a horizontal gap 74 is formed between the liquid sealing gasket 72 and the mounting ring 34, as depicted in FIG. 10. This arrangement provides a passageway through the gap 74 and the void 68 between the ribs 66 permitting a high flow of liquid to pass therethrough onto the pouring spout 40 and out of the carafe 20.

In operation, the stopper 58 is removed and the carafe 20 is filled liquid and the stopper 58 screwed back into place. When a person is desirous of pouring some of the liquid out of the carafe the stopper 58 is simply rotated by hand the opposite direction of the installation only a short distance and the liquid pours out freely. The configuration with the voids 68 continuing completely around the stopper 58 permits air to enter into the vessel on the higher side and liquid to leave the carafe on the opposite lower side and if the volume is insufficient the person simply rotates the stopper 58 a little further.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. A vacuum insulated carafe with a stopper having high flow characteristics comprising,
    a double wall metallic body, having an air evacuated middle space forming an insulating layer therebetween, said body having a top and a bottom,
    a base attached to the bottom of the body, for resting the carafe on a flat surface,
    a mounting ring connected to the top of the body having a outside surface and a central opening, with said mounting ring outside surface having a pouring spout and handle attachment means opposed on the outside surface and internal threads within the central opening,
    a handle, adjoined upon the mounting ring handle attachment means,
    an interfacing gasket sealing the mounting ring to the body,
    a stopper, defined as having an inner cup and an outer ring, said outer ring containing external male threads, and a plurality of integral ribs connecting the cup to the ring while forming a void between the ribs, a cap snapped onto said inner cup forming a dead air space between the cap and the inner cup, and
    a liquid sealing gasket disposed between the cap and the body inner cup assuring a airtight seal therebetween and in addition, creating a sealing surface between the stopper and the mounting ring, for sealing the stopper to the mounting ring when the stopper is screwed in until the stopper contiguously engages the ring, further, when the stopper is unscrewed a horizontal gap is formed between the liquid sealing gasket and the mounting ring providing a passageway through the gap and the void between the ribs, permitting a high flow of liquid to pass therethrough onto the pouring spout and out of the carafe.

2. The vacuum insulated carafe as recited in claim 1 wherein said double wall metallic body is formed of stainless steel.

3. The vacuum insulated carafe as recited in claim 1 wherein said base is formed of a thermoplastic selected from the group consisting of cellulose, phenolic, phenylene oxide, polycarbonate, polyester, polyethylene, polypropylene, polystyrene, acetyl, polyester, phenylene oxide, polymide and poly vinyl cloloride.

4. The vacuum insulated carafe as recited in claim 1 wherein said mounting ring is formed of a thermoplastic selected from the group consisting of cellulose, phenolic, phenylene oxide, polycarbonate, polyester, polyethylene, polypropylene, polystyrene, acetyl, polyester, phenylene oxide, polymide and poly vinyl cloloride.

5. The vacuum insulated carafe as recited in claim 1 further comprising a threaded fastener protected by a snap-in cover attaching said mounting ring to said metallic body.

6. The vacuum insulated carafe as recited in claim 5 further comprising indicia on said snap-in cover top indicating the type of liquid stored within the carafe.

7. The vacuum insulated carafe as recited in claim 1 wherein said mounting ring threads and mating stopper threads are, so called, acme type threads.

8. The vacuum insulated carafe as recited in claim 1 wherein said handle is of a resilient material and said handle further comprises a separate bottom cover.

9. The vacuum insulated carafe as recited in claim 1 wherein said handle further comprises a top thumb portion of resilient material.

10. The vacuum insulated carafe as recited in claim 1 wherein said handle is joined to said mounting ring with a threaded fastener.

11. The vacuum insulated carafe as recited in claim 1 wherein said interfacing gasket is selected from the group consisting of silicone, natural rubber, synthetic rubber, thermoplastic, neoprene, and viton.

12. The vacuum insulated carafe as recited in claim 1 wherein said stopper is formed of a thermoplastic selected from the group consisting of cellulose, phenolic, phenylene oxide, polycarbonate, polyester, polyethylene, polypropylene, polystyrene, acetyl, polyester, phenylene oxide, polymide and poly vinyl cloloride.

13. The vacuum insulated carafe as recited in claim 1 wherein said ribs extend exclusively between the cup and the ring and are angularly formed on a lower end to offset parallel misalignment of the cup to the ring.

14. The vacuum insulated carafe as recited in claim 1 further comprising said rib having a width of not more than 0.036 times its diameter.

15. A vacuum insulated carafe with a stopper having high flow characteristics comprising,
    an insulated body, having a top and a bottom,
    a base attached to the bottom of the body, for resting the carafe on a flat surface,
    a mounting ring connected to the top of the body, having a pouring spout, handle attachment means and internal threads within a central opening,
    a handle, adjoined onto the mounting ring with attaching means,
    a stopper, having an inner cup, an outer ring and a cap, said outer ring containing external male threads, and a plurality of integral ribs connecting the cup to the ring forming a void between the ribs,
    a liquid sealing gasket creating a sealing surface between the stopper and the mounting ring, for sealing the stopper to the mounting ring when the stopper contiguously engages the ring, further, when the stopper is unscrewed a horizontal gap is formed between the gasket and the mounting ring and, along with the void between the ribs, provides a high flow liquid passageway from the carafe.

16. A vacuum insulated carafe with a stopper having high flow characteristics comprising,
    a body, having a top and a bottom, a base attached to the bottom, for resting on a flat surface, a mounting ring connected to the top having a pouring spout and a handle also internal threads within a central opening, a stopper, having at least, an inner cup and an outer ring, said outer ring containing male threads and a plurality of integral ribs, connecting the cup to the ring forming a void between the ribs, a liquid sealing gasket creating a sealing surface between the stopper and the mounting ring, when the stopper is unscrewed with the threads a horizontal gap is formed between the gasket and the mounting ring and, along with the void between the ribs, providing a passageway for liquid to flow from the carafe.

* * * * *